United States Patent
Zagorski (10) Patent No.: US 10,391,961 B2
(45) Date of Patent: Aug. 27, 2019

(54) SYSTEMS AND METHODS FOR IMPLEMENTING DRIVING MODES IN AUTONOMOUS VEHICLES

(71) Applicant: GM GLOBAL TECHNOLOGY OPERATIONS LLC, Detroit, MI (US)

(72) Inventor: Chad T. Zagorski, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 206 days.

(21) Appl. No.: 15/622,681

(22) Filed: Jun. 14, 2017

(65) Prior Publication Data

US 2018/0361972 A1    Dec. 20, 2018

(51) Int. Cl.
*B60R 21/01* (2006.01)
*G05D 1/00* (2006.01)
*B60R 21/0132* (2006.01)
*B60R 21/015* (2006.01)

(52) U.S. Cl.
CPC ........ *B60R 21/0132* (2013.01); *B60R 21/015* (2013.01); *G05D 1/00* (2013.01); *G05D 1/0061* (2013.01)

(58) Field of Classification Search
CPC .............. B60R 21/0132; B60R 21/015; G05D 1/0061; G05D 1/00
See application file for complete search history.

(56) References Cited

U.S. PATENT DOCUMENTS 9,971,348 B1 *   5/2018   Canavor ............ G01C 21/3617
2017/0313323 A1 * 11/2017   Tseng ..................... B60K 35/00

* cited by examiner

*Primary Examiner* — Rodney A Butler
(74) *Attorney, Agent, or Firm* — Lorenz & Kopf LLP (57) ABSTRACT

Systems and method are provided for controlling a vehicle. In one embodiment, a method for selecting a driving mode for a vehicle includes receiving occupant preference information indicative of whether an occupant prefers that the vehicle operating in a driving mode (e.g., a sport mode), receiving a set of vehicle state parameters indicative of whether the operational state of the vehicle is conducive to the driving mode, and receiving a set of occupant state parameters indicative of the state of one or more occupants of the vehicle. The method further includes selecting a driving mode based on the occupant preference information, the set of vehicle state parameters, and the occupant state parameters, and then engaging vehicle tuning parameters for the vehicle based on the selected driving mode.

15 Claims, 6 Drawing Sheets

FIG. 6

SYSTEMS AND METHODS FOR IMPLEMENTING DRIVING MODES IN AUTONOMOUS VEHICLES

TECHNICAL FIELD

The present disclosure generally relates to autonomous vehicles, and more particularly relates to systems and methods for selecting one or more driving modes, such as sport modes, in an autonomous vehicle.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in autonomous vehicles, such vehicles might still be improved in a number of respects. For example, some currently known autonomous vehicles are designed to operate in a slow, conservative manner that may be uninspiring to driving enthusiasts who tend to prefer a more aggressive driving experience, particularly in driving contexts and on roadways where such a driving mode would be appropriate.

Accordingly, it is desirable to provide systems and methods for implementing sport modes and other selectable driving modes in autonomous vehicles. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling an autonomous vehicle. In one embodiment, a method of selecting a driving mode for a vehicle includes receiving occupant preference information indicative of whether an occupant prefers that the vehicle operating in a sport mode, receiving a set of vehicle state parameters indicative of whether the operational state of the vehicle is conducive to the sport mode, and receiving a set of occupant state parameters indicative of the state of one or more occupants of the vehicle. The method further includes selecting a sport mode based on the occupant preference information, the set of vehicle state parameters, and the occupant state parameters, and then engaging vehicle tuning parameters for the vehicle based on the selected sport mode.

In one embodiment, an autonomous vehicle includes one or more sensors provided configured to observe an occupant within the interior of the autonomous vehicle and produce sensor data associated therewith. The autonomous vehicle further includes a vehicle mode selection module, including a processor, configured to select a driving mode for the vehicle by: receiving occupant preference information indicative of whether the occupant prefers that the vehicle operating in a sport mode; receiving a set of vehicle state parameters indicative of whether the operational state of the vehicle is conducive to the sport mode; receiving a set of occupant state parameters based on the sensor data and indicative of the state of one or more occupants of the vehicle, and engage vehicle tuning parameters for the vehicle based on the occupant preference information, the set of vehicle state parameters, and the occupant state parameters.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
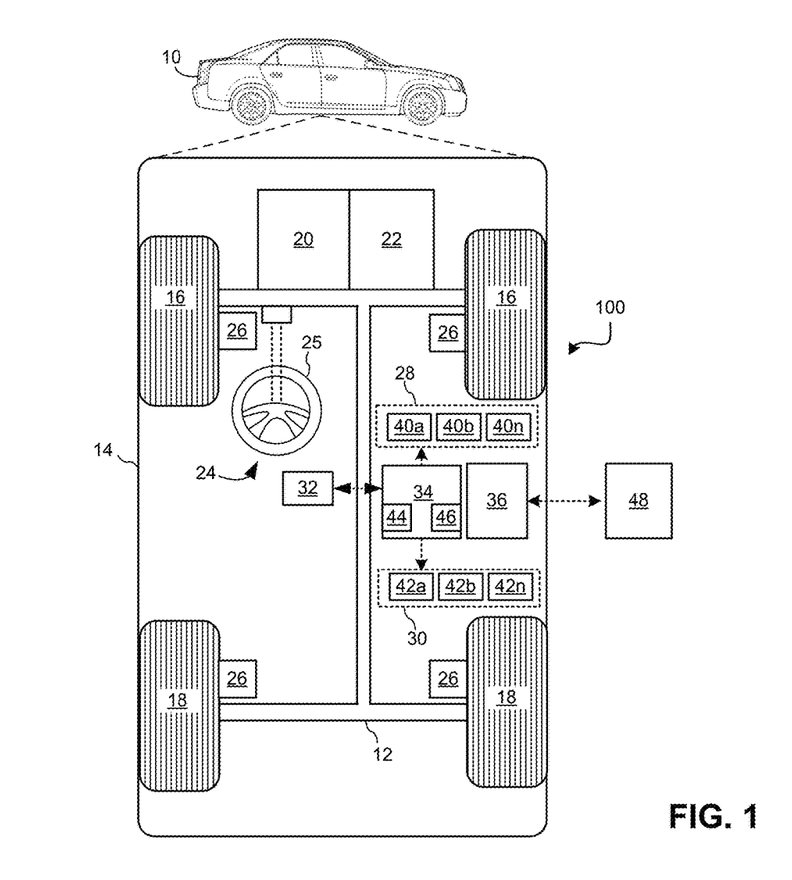
FIG. 1 is a functional block diagram illustrating an autonomous vehicle having a driving mode selection system, in accordance with various embodiments.

With reference to FIG. 1, a driving mode selection system shown generally as 100 is associated with a vehicle 10 in accordance with various embodiments. In general, driving mode selection system (or simply "system") 100 allows for engaging a "sport" mode based on parameters indicative of the vehicle's state (e.g., road conditions, nearby traffic, etc.) as well as parameters indicative of the occupant(s) state (e.g., number and location of passengers, etc.).

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the driving mode selection system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, driving mode selection systems in accordance with the present embodiment may be used in conjunction with any autonomous vehicle that utilizes a navigation system to provide route guidance.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system, or some combination of the above. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, DSRC (Vehicle to X), and/or other sensors. In some embodiments, sensing devices 40a-40n include one or more sensors capable of observing occupants of the vehicle and classifying their respective states (e.g., using a trained neural network or other such classification model known in the art).

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured to allow an occupant to select a driving mode based on occupant preferences, vehicle state, and occupant state.

Figure 2:
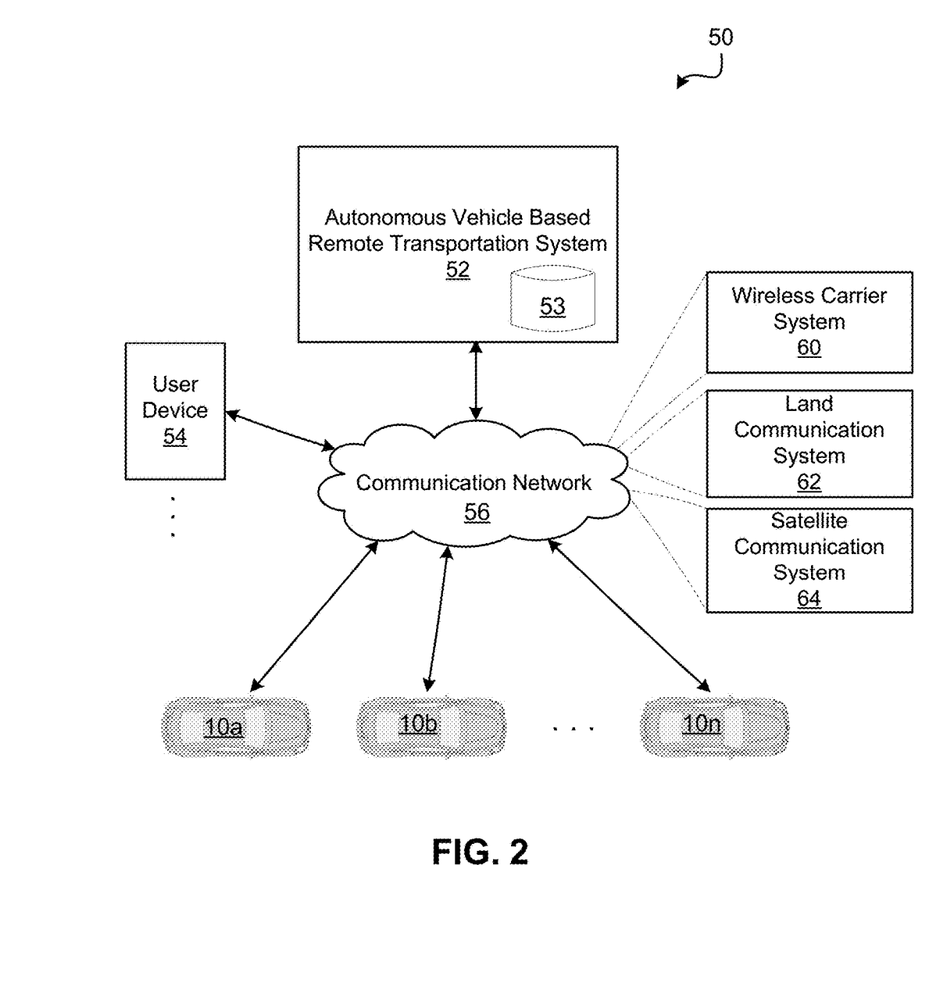
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
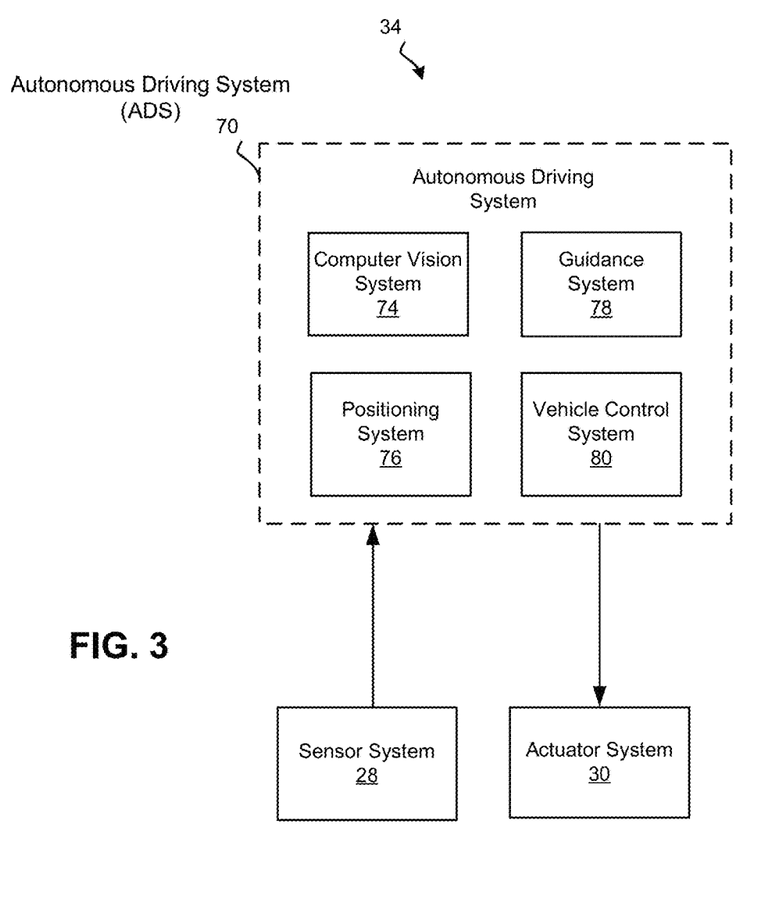
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to the lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the driving mode selection system 100 of FIG. 1 is configured to allow an occupant to adjust the driving parameters of AV 10 to select from one or more sport modes when, based on predefined rules and criteria, the vehicle state and occupant state allow such adjustments.

Figure 4:
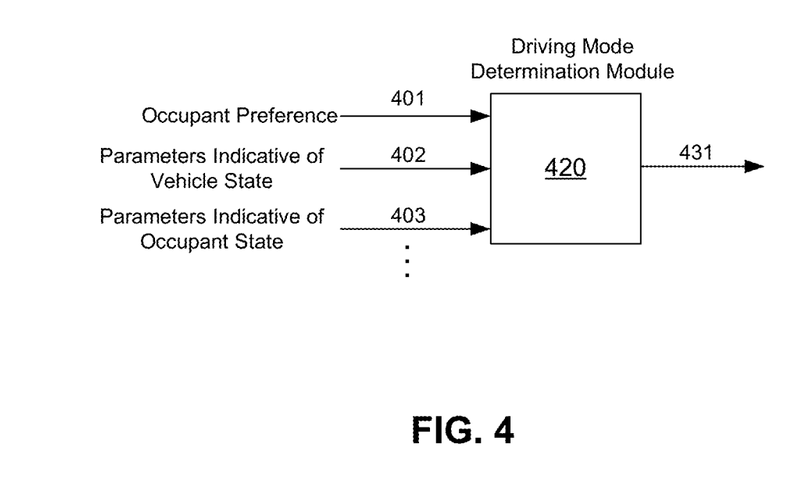
FIG. 4 is a dataflow diagram illustrating a driving mode selection system of an autonomous vehicle, in accordance with various embodiments.

Referring to FIG. 4, an exemplary driving mode selection system generally includes a driving mode determination module (or simply "module") 420 that receives occupant preference information 401, parameters indicative of vehicle state (or "vehicle state parameters") 402, and parameters indicative of occupant state (or "occupant state parameters") 403. Module 420 then produces an output 431 corresponding to a desired sport mode—e.g., a set of parameter adjustments associated with one or more sport modes.

As used herein, the term "sport mode" refers to a mode that—consistent with how that term is used in the automotive industry—imparts a more aggressive driving "feel" to the occupant. Furthermore, a vehicle may offer a choice between multiple sport modes that provide successive levels of "sportiness." For example, the sport modes may be specified as "level 1" (standard sport mode), and "level 2" (full racetrack experience). Any number of such levels may be specified. Such sport modes have been implemented in traditional motor vehicles, and thus need not be described in exhaustive detail herein. Nevertheless, it is illustrative to note that sport mode "tuning" may diverge from the "normal" (typically default) mode of AV 10 in terms of a number of vehicle parameters, such as transmission shift points, maximum acceleration/deceleration rates, torque converter clutch slip, exhaust noise, road noise, engine mount rates, active noise cancellation, suspension softness, engine calibration adjustments, seat characteristics, cylinder deactivation, rate/aggressiveness of steering inputs, and the like. It should be appreciated that while the present application uses the phrase "sport modes," it will be appreciated that the this term is used without loss of generality, and that the "modes" may include a spectrum of driving parameter categories.

Occupant preference information 401 includes, in any form, any indicator of whether the occupant or occupants prefer that AV 10 operate in a sport mode. Such a preference (which may be stored as any convenient data structure) may be produced in response to a prompt to the occupant(s), or may be the result of a predefined preference stating that, when vehicle and occupant conditions are right, the occupant would prefer a sport mode rather than a "normal" operating mode. In one embodiment, for example, an occupant may affirmatively request a sport mode through a suitable user interface provided by AV 10 (e.g., a touchscreen, a spoken dialog interface, etc.). In other modes, a user interface within AV 10 queries the occupant(s) as to whether they would prefer to change to a sport mode.

Vehicle state parameters 402 include information relating to the vehicle and its environment. In that regard, vehicle state parameters 402 might include, for example, local traffic density, the nature of the current roadway, local weather conditions, and the like. Parameters 402 might also include any other relevant information received from other sources, such as other vehicles in the area, "smart road" sensors, coefficient of friction sensors, etc. Parameters 402 may be stored as any convenient data structure.

Figure 5:
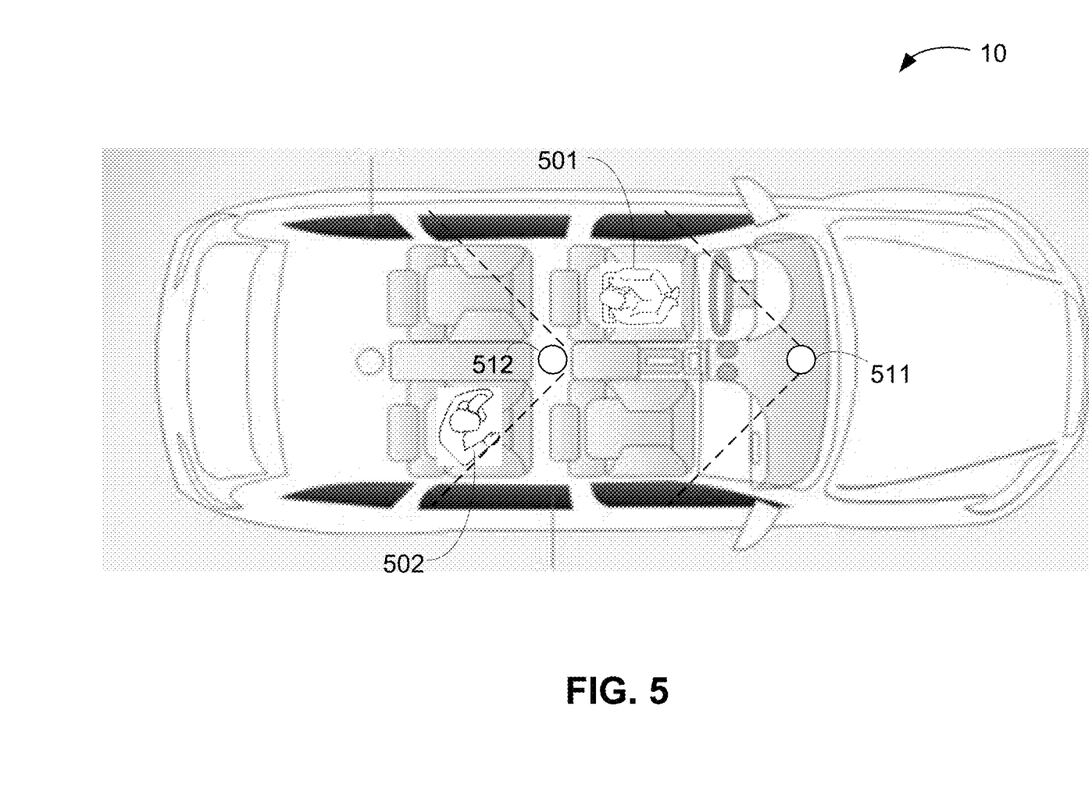
FIG. 5 is a conceptual interior view of an autonomous vehicle in accordance with various embodiments.

Occupant state parameters 403 include information characterizing the state of one or more occupants of AV 10 (as determined via sensors 511, 512). For example, parameters 403 might indicate whether there are occupants in a third row of a vehicle (in which case sport driving might be undesirable), the age of the occupants, the driving experience of the occupants, whether one or more occupants are sleeping or otherwise not as alert as may be desired, and the like.

Module 420 may be implemented in a variety of ways, ranging from a relatively simple decision tree to a machine learning model that undergoes either supervised or unsupervised learning. In general, it will be understood that various embodiments of the system 100 according to the present disclosure can include any number of sub-modules embedded within the controller 34. As can be appreciated, the sub-modules shown in FIG. 4 can be combined and/or further partitioned to similarly select driving modes (or mode, depending upon whether multiple sport driving are provided). Inputs to the system 100 may be received from the sensor system 28, received from other control modules (not shown) associated with the autonomous vehicle 10, received from the communication system 36, and/or determined/modeled by other sub-modules (not shown) within the controller 34 of FIG. 1.

FIG. 5 depicts, in simplified form, the interior of an exemplary vehicle 10 including two occupants: occupant 501, shown seated in the front driver's seat, and occupant 502, shown seated in a rear passenger seat. Also shown in FIG. 5 are two sensors 511 and 512 that are configured to observed occupants 501 and 502, as well as any other occupants that may reside in vehicle 10. It will be understood that any number of sensors may be employed in any convenient locations, and that the illustrated embodiment is not intended to be limiting. Regardless of the number and location of sensors 511, 512, the sensors may be IR sensors, optical sensors, or any other kind of sensor that is capable of producing an image or the like indicative of the state of occupants 501 and 502. The data produced by sensors 511 and 512 is thus used as input 403 to module 420, as shown in FIG. 4.

Figure 6:
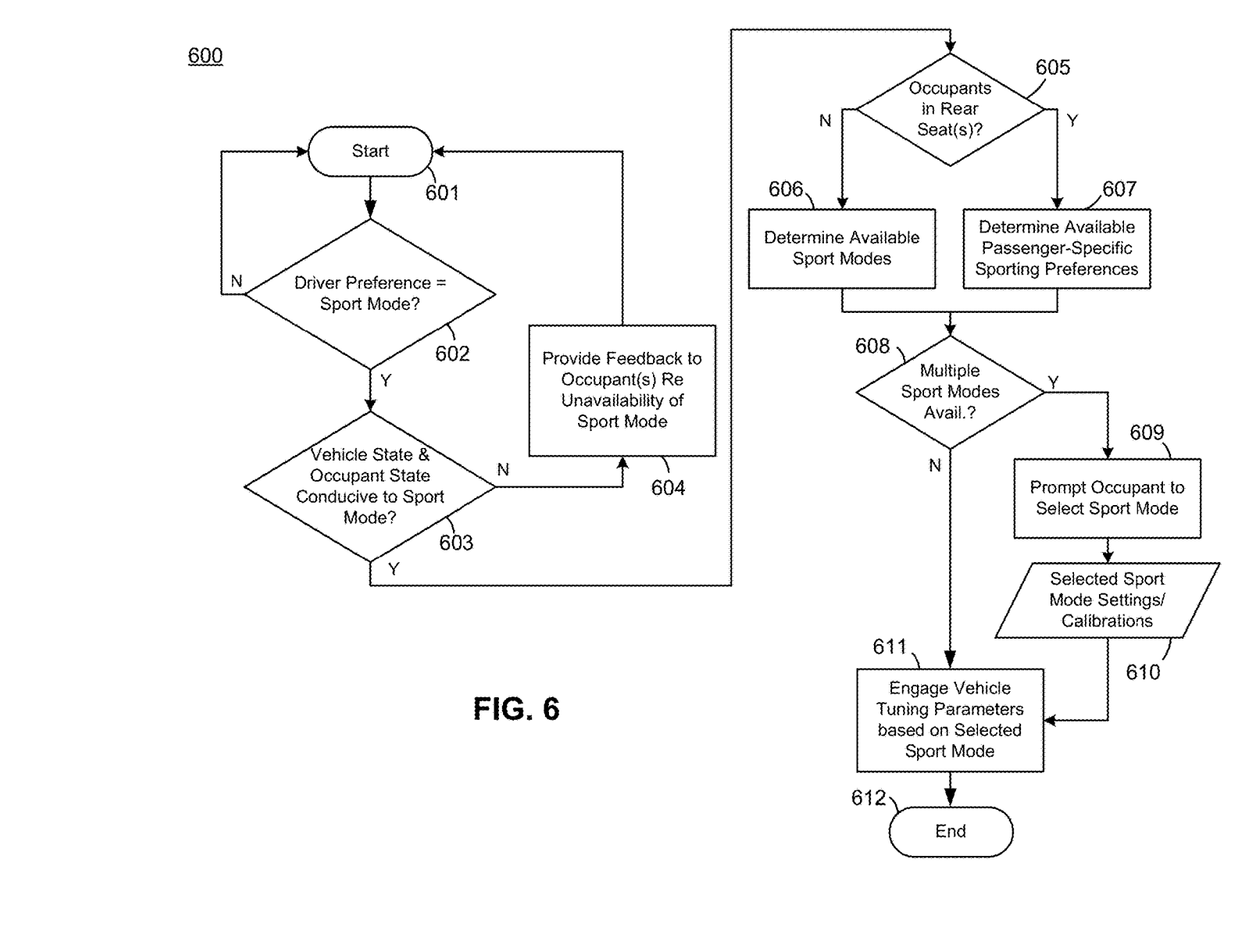
FIG. 6 is a flowchart illustrating a control method for controlling the autonomous vehicle, in accordance with various embodiments.

Referring now to FIG. 6, and with continued reference to FIGS. 1-5, the illustrated flowchart provides a control method 600 that can be performed by system 100 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. In various embodiments, the method 600 can be scheduled to run based on one or more predetermined events, and/or can run continuously during operation of the autonomous vehicle 10.

In various embodiments, the method begins at 601, and proceeds to 602, in which the system determines whether the vehicle occupants' preference at that moment corresponds to "sport mode." If not, the system proceeds back to step 601; if so, then processing continues at 603, in which it is determined whether the vehicle state and occupant state are conducive (i.e., appropriate) to one or more sport modes. The conditions might be considered more conducive to a sport mode when, for example, local traffic density is low, the current roadway offers good visibility and is amenable to relatively aggressive driving, the local weather does not include precipitation, the coefficient of friction of the roadway is high, there are only one or two occupants of the vehicle, and they are seated in the front row, etc. For example, sport mode might only be allowed when temperatures are above 10° Celsius, when it has not rained or snowed within the last twelve hours, when it is daytime, when there are three or less occupants in the vehicle, none of whom are sleeping, when no occupants are located in the third row, and/or when forward visibility is confirmed to be at least 200 meters.

If at 603 it was determined that the vehicle and occupant states are conducive to a sport mode, the system continues at 605 and determines whether there are occupants in the rear seat (e.g., such as occupant 502 in FIG. 5). If not, the system determines the available sport modes. That is, depending upon the nature of AV 10, the vehicle (and module 420 in FIG. 4) may offer zero, one, two, or more sport modes. Such information may be stored, for example, in storage 46 of controller 34.

If at 605 it was determined that one or more occupants were present in a rear seat, the system determines whether there are any passenger-specific sporting preferences. That is, there might be one preference that is suitable for a single individual in a rear seat, another preference that is suitable for two individuals in a rear seat, and so on. In some instances, there may be no appropriate sport mode if there are a nonzero number of back seat occupants. This query may also take into account whether and to what extent occupants are seated in a third row of AV 10, if such a third row is present.

Next, at 608, if multiple sport modes are available, the system prompts (through an appropriate user interface) to confirm that the occupant(s) would like to engage sport mode (609), and then selects the sport mode settings and calibration settings (610) that are appropriate for that mode. In some embodiments, the user interface includes one or more mechanical dials and/or switches. In other embodiments, the user interface may be implemented by a tablet, smartphone, or other mobile device communicatively coupled to AV 10.

Finally, at 611, the system engages the vehicle tuning parameters associated with the selected sport mode (which, as noted above, may be stored in storage component 46 of controller 34). That is, storage component 46 might include a data structure including a list of sport modes along with their corresponding vehicle tuning parameters.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A computer implemented method of selecting a driving mode for a vehicle, the method comprising:
    receiving, by a processor, a set of occupant state parameters indicative of a state of one or more occupants of the vehicle;
    prompting, by the processor, the one or more occupants of the vehicle to select a first driving mode from a set of candidate sport modes that are specific to a number and a position of the one or more occupants of the vehicle and determined from the set of occupant state parameters;
    receiving, by the processor, occupant preference information indicative of whether one or more occupants prefer that the vehicle operate in the first driving mode;
    receiving, by the processor, a set of vehicle state parameters indicative of whether the state of the vehicle is conducive to the first driving mode;
    selecting, by the processor, the first driving mode based on the occupant preference information, the set of vehicle state parameters, and the occupant state parameters; and
    engaging, by the processor, vehicle tuning parameters for the vehicle based on the first driving mode.

2. The method of claim 1, wherein the vehicle tuning parameters include parameters relating to at least one of transmission shift points, maximum acceleration rate, torque converter clutch slip, exhaust noise, road noise engine mount rates, active noise cancellation, suspension softness, engine calibration, seat characteristics, cylinder deactivation, and maximum lateral acceleration.

3. The method of claim 1, wherein the set of occupant state parameters includes a determination as to whether one or more of the occupants are seated in a rear area of the vehicle.

4. The method of claim 3, wherein the set of occupant state parameters includes a determination as to whether one or more occupants are seated in a third row of the rear area of the vehicle.

5. The method of claim 1, wherein the set of occupant state parameters are determined in part from a set of optical sensors provided within an interior of the vehicle.

6. The method of claim 1, further including providing feedback to the occupant if the first driving mode is unavailable based on the occupant preference information, the set of vehicle state parameters, and the occupant state parameters.

7. An autonomous vehicle comprising:
    one or more sensors provided within an interior of the autonomous vehicle, the one or more sensors configured to observe one or more occupants within the interior of the autonomous vehicle and produce sensor data associated therewith;
    a driving mode determination module, including a processor, configured to, by the processor,
    select a driving mode for the vehicle by:
        receiving, by the processor, a set of occupant state parameters indicative of a state of one or more occupants of the vehicle;
        prompting, by a processor, the one or more occupants of the vehicle to select a first driving mode from a set of candidate sport modes that are specific to a number and a position of the one or more occupants of the vehicle and determined from the set of occupant state parameters;
        receiving occupant preference information indicative of whether the one or more occupants prefer that the vehicle operating in the first driving mode;
        receiving a set of vehicle state parameters indicative of whether a state of the vehicle is conducive to the first driving mode; and
        engaging vehicle tuning parameters corresponding to the first driving mode for the vehicle based on the occupant preference information, the set of vehicle state parameters, and the occupant state parameters.

8. The autonomous vehicle of claim 7, wherein the vehicle tuning parameters include parameters relating to at least one of transmission shift points, maximum acceleration rate, torque converter clutch slip, exhaust noise, road noise engine mount rates, active noise cancellation, suspension softness, engine calibration, seat characteristics, cylinder deactivation, and maximum lateral acceleration.

9. The autonomous vehicle of claim 7, wherein the set of occupant state parameters includes a determination as to whether one or more of the occupants are seated in a rear area of the vehicle.

10. The autonomous vehicle of claim 9, wherein the set of occupant state parameters includes a determination as to whether one or more occupants are seated in a third row of the rear area of the vehicle.

11. The autonomous vehicle of claim 7, wherein the set of occupant state parameters are determined in part from a set of optical sensors provided within an interior of the vehicle.

12. The autonomous vehicle of claim 7, further including providing feedback to the occupant if the first driving mode is unavailable based on the occupant preference information, the set of vehicle state parameters, and the occupant state parameters.

13. A system for selecting driving modes in an autonomous vehicle, the system comprising:
    one or more sensors provided within an interior of the autonomous vehicle, the one or more sensors configured to observe one or more occupants within the interior of the autonomous vehicle and produce sensor data associated therewith;
    a driving mode determination module, including a processor, configured to, by the processor, select a driving mode for the vehicle by:
        receiving, by the processor, a set of occupant state parameters indicative of a state of one or more occupants of the vehicle;

prompting, by a processor, the one or more occupants of the vehicle to select a first driving mode from a set of candidate sport modes that are specific to a number and a position of the one or more occupants of the vehicle and determined from the set of occupant state parameters;

receiving occupant preference information indicative of whether the one or more occupants prefer that the vehicle operating in the first driving mode;

receiving a set of vehicle state parameters indicative of whether a state of the vehicle is conducive to the first driving mode;

engaging vehicle tuning parameters corresponding to the first driving mode for the vehicle based on the occupant preference information, the set of vehicle state parameters, and the occupant state parameters.

14. The system of claim 13, wherein the vehicle tuning parameters include parameters relating to at least one of transmission shift points, maximum acceleration rate, torque converter clutch slip, exhaust noise, road noise engine mount rates, active noise cancellation, suspension softness, engine calibration, seat characteristics, cylinder deactivation, and maximum lateral acceleration.

15. The system of claim 13, wherein the set of occupant state parameters includes a determination as to whether one or more of the occupants are seated in a rear area of the vehicle.

* * * * *